US006774787B1

(12) United States Patent
Melbourne

(10) Patent No.: US 6,774,787 B1
(45) Date of Patent: Aug. 10, 2004

(54) ELECTRONIC LOCATOR SYSTEM AND METHOD

(76) Inventor: David J. Melbourne, 6402 Elm Springs Dr., Arlington, TX (US) 76001

( * ) Notice: Subject to any disclaimer, the term of this patent is extended or adjusted under 35 U.S.C. 154(b) by 116 days.

(21) Appl. No.: 10/157,373

(22) Filed: May 29, 2002

(51) Int. Cl.[7] .................................................. H04Q 7/00

(52) U.S. Cl. ............................... 340/539.1; 340/539.11; 340/539.32

(58) Field of Search ......................... 340/539.1, 539.11, 340/539.14, 539.15, 539.32

(56) References Cited

U.S. PATENT DOCUMENTS 5,515,033 A 5/1996 Matarazzo
5,677,673 A * 10/1997 Kipnis ................... 340/539.32
5,680,105 A * 10/1997 Hedrick ...................... 340/571
5,939,981 A 8/1999 Renney
6,133,832 A 10/2000 Winder et al.
6,297,737 B1 * 10/2001 Irvin .......................... 340/571
6,366,202 B1 4/2002 Rosenthal
6,501,378 B1 * 12/2002 Knaven ................... 340/539.1

* cited by examiner

*Primary Examiner*—Daryl Pope
(74) *Attorney, Agent, or Firm*—Dan Brown Law Office; Daniel R. Brown

(57) ABSTRACT

An electronic object locator apparatus and method for operation in conjunction with other functionally compliant locators. The locator includes a controller with an actuator and indicator. A transmitter is coupled to transmit search signals and found signals output from the controller, and, a receiver is coupled to output received search signals and found signals to the controller. In operation the controller outputs a first search signal upon actuation of the actuator, and activates the indicator upon receipt of a first found signal responsive to the first search signal. In addition, the controller outputs a second found signal and activates the indicator in response to receipt of a second search signal. Multiple actuators are provided to address multiple functionally compliant locators. Radio signaling is employed, and may be operated under FCC Part 15. The search signals may include both a unit identity and a series identity. Braille symbols and icons can be applied to the actuators. A programming port is supplied so that automated test and programming equipment can be employed. The locator can be built into the objects that are located by the system.

35 Claims, 6 Drawing Sheets

ELECTRONIC LOCATOR SYSTEM AND METHOD

BACKGROUND OF THE INVENTION

1. Field of the Invention

The present invention relates to systems for locating objects. More specifically, the present invention relates to a wireless system having plural transceivers, some of which may be coupled to objects and used to locate the objects when they are not otherwise readily perceivable.

2. Description of the Related Art

Technology provides a multitude of products that enhance modem life. In the area of consumer electronics, a few examples are; the wireless remote control, the wireless or cordless telephone, personal digital assistants ("PDA"), pagers, portable computers, personal music players, audio, image, and video capture devices, and many other portable electronic devices. When one ponders the conveniences of modem life it is amazing how many portable products and devices people use everyday. Other examples include eyeglasses, watches, medicine, address directories, telephone number listings, various containers of personal objects, medical monitoring and testing devices, items for personal hygiene, and many other categories, each including many individual objects. A complete listing of personal portable devices and objects that people use to enhance life would be enormous, and every growing. While all of these "objects" offer enhancements of one kind or another, it is ironic that they also create a new challenge for users. This is the challenge of keeping track of the location of all these objects. Everyone has lost, mislaid, misplaced or otherwise lost track of their keys, TV remote control, or some other object, and, then spent an inordinate amount of time trying to locate the object.

There have been attempts to offer products designed to assist users in locating lost items. Some systems require the user to clap or whistle to acoustically signal a locator device that responds in turn with a visual or aural indicator. However, such manual acoustic systems have proven to be unreliable and prone to failed and false responses. Other systems are known that employ a transmitting device, which communicates a wireless signal to a receiving/locator device, which then responds with a visual or aural indication that the transmitted signal has been received. A major drawback of such a system is that it requires the user to keep track of yet another object, namely the transmitter used in the locator system. In addition, the receiving locator device is yet another object that must be coupled to the primary objected it is associated with. Prior art receiver/locators are frequently as bulky as the object to which they are associated.

There are other issues with respect to the perceptibility of visual or aural response indications. For example, when an object with a receiver/locator has fallen into a couch such that any visual indicator is hidden and aural indications are muffled, the user may not be able to perceive that responsive indicator. Or, if the lost object is in another room such that its responsive indicators are not perceivable, the user may give up their search, or continue to search in vain, without knowledge that the lost object is located nearby. Thus, there is a need in the art for an apparatus, system and method for locating objects that eliminates the requirement of a dedicated transmitting device, overcomes the limitations associated with visual and aural indicators, and that is of such diminutive size and low cost that it can coupled to, or incorporated into, the object to which it is associated in a way that does not significantly increase the bulk or cost of the primary object.

SUMMARY OF THE INVENTION

The need in the art is addressed by the apparatus and methods of the present invention. A locator for locating objects associated therewith is taught. The locator, for operation in conjunction with a functionally compliant second locator, includes a controller with an actuator and an indicator coupled thereto. A transmitter is coupled to transmit search signals and found signals output from the controller. Also, a receiver is coupled to output received search signals and found signals to the controller. In operation, the controller outputs a first search signal upon actuation of the actuator, and activates the indicator upon receipt of a first found signal responsive to the first search signal. The controller also outputs a second found signal and activates the indicator in response to receipt of a second search signal.

In a specific embodiment of the present invention, the search signals include a locator identity. The identity m;ay include a unit identity or a series identity of plural functionally compliant locators. When an identity is included, the controller specifies the identity in accordance with actuation of the actuator. In a refinement, the controller specifies a portion of plural identities of plural functionally compliant locators in accordance with actuation of the actuator. The selection of one particular identity is simplified when the actuator further comprises plural individual actuators coupled to the controller, each selecting a particular identity. Either of the first or second search signals may include the identity of the sought locator.

In a specific embodiment, the actuator includes a Braille symbol that is representative of the functionally compliant locator identity. In another approach, the actuator includes and icon representative of an object for association with the functionally compliant locator. The icon may be user selectable, such as with a self-adhesive sticker. Several indicator types can be utilized, including visual indicators, audible indicators, and tactile indicators. In a particular embodiment, the controller activates the indicator to produce a first kind of indication upon the actuation of the actuator, a second kind of indication upon the receipt of the first found signal, and a third kind of indication upon receipt of the second search signal. The differences may include the number of beeps and flashes or the duration of beeps and flashes. In a refinement, the controller activates the indicator to produce a fourth kind of indication if the actuation selects the unit identification of the locator, that is, the locator is asked to seek itself. In a further refinement, the duration or frequency of the beeps and flashes may be representative of the range to the sought unit.

The transmitter may be a radio transmitter, and may operate compliant with FCC Part 15. The information may be encoded via carrier pulse modulation. Radio wave coupling may be accomplished with an antenna coupled to the transmitter. The antenna may be a loop antenna. Likewise, radio wave reception may be accomplished with an antenna coupled to the receiver. The receiver antenna may be a loop antenna. A single antenna may be used for both receiver and transmitter or a functionally identical transceiver circuit.

In an additional refinement of the present invention, the controller operates to interpret a sequence of actuator actions as programming instructions to define a unit identity or a series identity. To aid in automatic programming, the locator includes a programming port interface coupled to the controller for interfacing the locator to an external programming device for programming operational parameters there into. While stand-alone locators are contemplated, the controller, the actuator, the indicator, the transmitter, and the receiver may be combined into an object that is to be located. Further, in the case of a stand-alone locator, the unit may further include an enclosure, where the enclosure is color coded to identify the locator as being functionally compliant with the functionally compliant second locator, and this may correspond to the series identity.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

People routinely misplace important personal items every day. Radio transmitters paired with receiver/locators have been attempted in the past. The latest systems use short-range radio. However, such systems require the use of a separate transmitter, which is used to locate the associated receivers. These systems have a major drawback; keeping track of the transmitter. In effect, the solution exacerbates the problem itself because it requires the user to keep track of yet another object, the transmitter. Since the transmitters used in the prior art systems are relatively large, the option of carrying the transmitter around just in case has not been practical. What was needed, and what is addressed by the teachings of the present invention is a system whereby all the personal objects could be used to find one other. Thus, having any single object allows the user to find the others. For example, the car keys can be used to locate the TV remote, the TV remote used to locate the cordless telephone, and so on.

The present invention teaches an illustrative embodiment that employs several functionally compliant miniature radio transceiver units, or locators, any one of which can be used to selectively locate any of the others. Each locator is associated with some other object by physically connecting the locator and the object together. An actuator on a first locator is actuated to both select a specific misplaced locator/object and to initiate a radio transmitter search signaling procedure. In operation, the actuation not only initiates the usual audio and visible response alert signals, but also a radio return signal from the sought locator/object to the transmitting first locator. Thus, even if the sought object is positioned such that the audio and visual alert signals cannot be detected by the user, verification of the presence of the item is supplied at the transmitting locator to help narrow the area of the search. Since the illustrative embodiment locator system is small and draws very little electric power from a tiny battery, it can also be integrated into various kinds of personal objects and personal electronic items so that that they can be easily located when misplaced.

Figure 1:
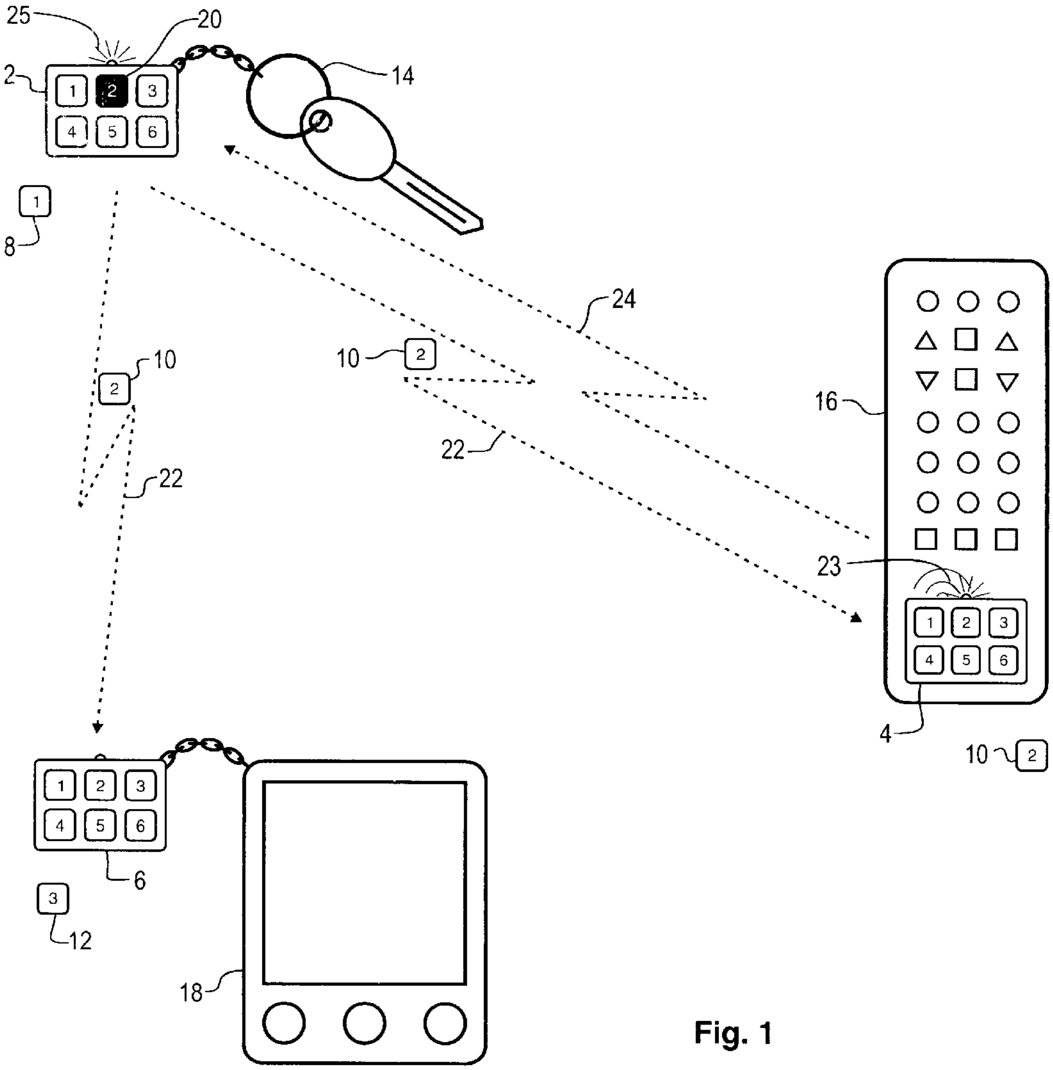
FIG. 1 is an electronic locator system diagram according to an illustrative embodiment of the present invention.

Reference is direct to FIG. 1, which is an electronic locator system diagram according to an illustrative embodiment of the present invention. A first locator 2 is coupled to a car key set 14. The locator has a unit identity of one 8. In the illustrated example, the user also has a second locator 4 adhesively coupled to a TV remote control 16. The second locator 4 has a unit identity of two 10. A third locator 6 is connected to a personal digital assistant (PDA) 18, and has a unit identity of three 12. In the example in FIG. 1, the user presently has the car keys 14 and is seeking the TV remote control 16. The search is initiated by actuating the number two actuator 20 on the first locator 2. The user knows of the unit identity of the TV remote locator 4 by prior association. Techniques for making prior association of locators and objects easier to remember and more convenient will be discussed hereinafter. When the two actuator 20 is actuated on the first locator 2, this causes a transmitter (not shown) in the first locator 2 to transmit a search signal 22 that includes the unit identity of two 10. Of course, the transmitted search signal 22 radiates to all the local locator units, 4 and 6.

The transmitted search signal 22 is received by a receiver (not shown) in both of the second locator 4 and the third locator 6. The third locator 6 ignores the search signal because the transmitted unit identity two 10 does not match the third locator's actual unit identity of three 12. However, the second locator does respond to the transmitted search signal 22 because the transmitted unit identity of two 10 does match the second locator's internal unit identity. The second locator 4 responds by activating its indicators 23 and by transmitting a found signal 24. In the illustrative embodiment, the indicator includes both a visible indicator and an audible indicator that emit light and a beeping sound, respectively 23. The user may be in such proximity to the second locator 4 that the indicators and be readily perceived. The found signal that is transmitted 24 by the second locator 4 is received by a receiver (not shown) in the first locator 2. The temporal relationship between the search signal 22 and the found signal 24 establishes the mutuality between the two signals and causes the first locator 2 to activate its indicator 25. In the illustrative embodiment, this is a visual indicator that emits a flashing light 25. Thus, the proximity between the first, seeking, locator 2 and the second, sought, locator is established to be within the radio range of the system, notwithstanding the user's ability to perceive the second locator's 4 indicators 23. In effect, the user knows that the sought object is here, somewhere, and can continue to move about until the indicators become perceivable.

The illustrative embodiment locators, 2, 4, and 6, employ six actuators, and thus define a system of up to six functionally compliant locators. Of course, the number selected is a design choice depending on the intended uses and market for the locator system. In the illustrative embodiment, the search signal includes a series identity in addition to the unit identities. There are six series identities, and this number is a design choice as well. Each locator is preprogrammed with both the series identity and the unit identity. The series identity allows up to six locator systems to operate within a given locale without interference amongst the different series. The illustrative embodiment provides that the series identity of plural locators can be identified with a color-coded case or label. For example, a first series may all be enclosed in a blue case and a second series encoded in a pink case, and so on. The color-coded label may be user selectable, as by applying a pressure sensitive color-coded label to each locator in a given series.

Figure 2:
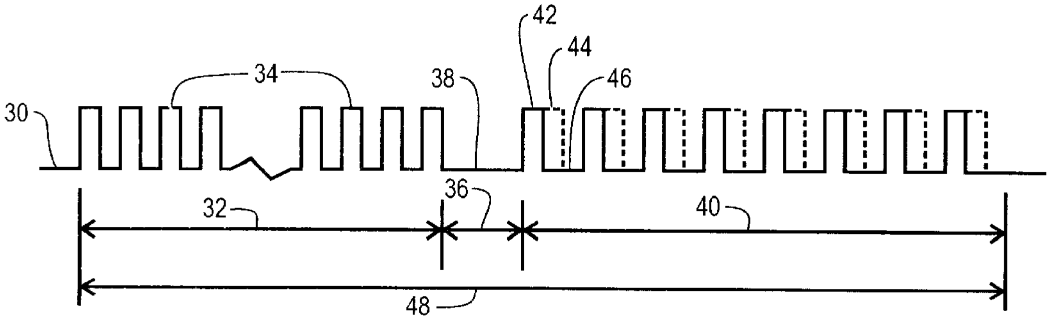
FIG. 2 is a search signal data diagram according to an illustrative embodiment of the present invention.

Reference is directed to FIG. 2, which is a search signal data diagram 30 according to an illustrative embodiment of the present invention. When an actuator is actuated, a controller in the locator produces a data packet and couples it to a transmitter for radio transmission. The data packet 30 has a timing duration 48 that is long enough to transmit a preamble period 32, a header period 36 and a data period 40. In the illustrative embodiment the data packet 30 is a series of transmitter carrier activations that generate an encoded pulsed carrier data packet. The use and advantages of a pulsed carrier signal are known to those skilled in the art. The preamble period consists of fifty bit reversals 34, each two milliseconds in duration. The preamble signal 34 is detected by the sought locators, and causes them to wake-up from a power saving sleep mode to receive the useful data the follows the preamble. The power management aspects of the illustrative embodiment will be more fully described hereinafter. At the end of the preamble period 32, the packet 30 has a three bit period long header where the carrier is low 38, which marks the beginning of the data period 40. The data period consists of eight bits of data encoded with a leading carrier high bit 42, the actual data bit 44, and a trailing carrier low bit 46. The eight bits of data are transmitted in sequence during the data period 40. Four bits are used to define the unit identity and four bits are used to define the series identity.

Those skilled in the art will appreciate that many forms of radio signal modulation are applicable to the present invention. Amplitude modulation, frequency modulation, phase modulation, spread spectrum modulation, continuous wave modulation, and all their various derivatives are readily applicable to the present invention. As well as other forms of wireless singling, including light and laser systems, acoustic systems, and other electromagnetic schemes of wireless communications that are know to those skilled in the art or that may later be developed. The dimension and scope of the unit identity and series identity are equality flexible. Uniquely encoded identities of various bit depths can be employed such that every single locator produced is uniquely identifiable. Encryption can also be applied to the system if desired. Those skilled in the art will appreciate that the straightforward system taught with respect to the illustrative embodiment offers a sufficient degree of versatility, while allowing the use of low cost and low power consuming components. Thus allowing the product to be cost effective, small, lightweight, and allowing it to operate on button cell batteries for long periods of time. All of which are desirable attributes in such as system.

Figure 3B:
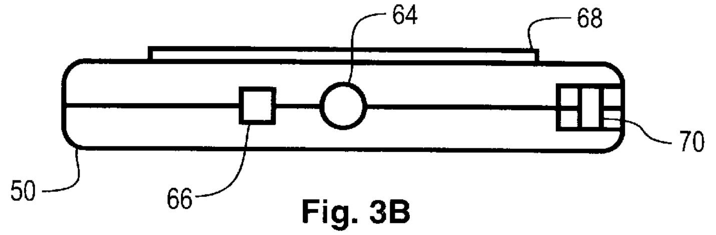
FIG. 3B is a top view of an electronic locator according to an illustrative embodiment of the present invention.
Figure 3A:
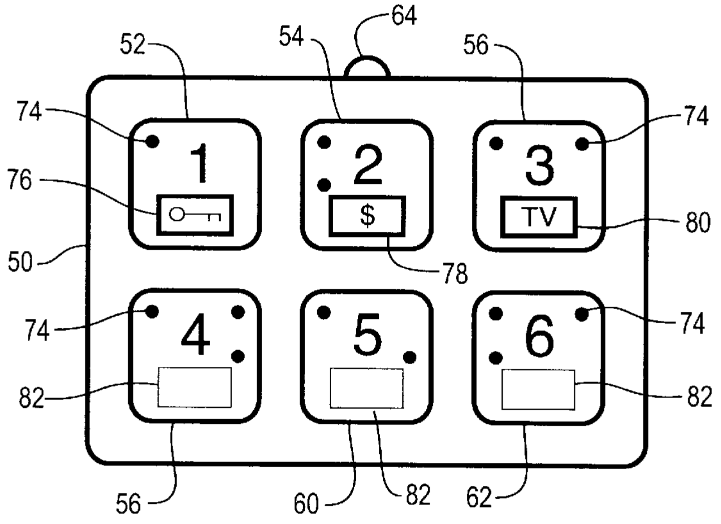
FIG. 3A is a front view of an electronic locator according to an illustrative embodiment of the present invention.
Figure 3C:
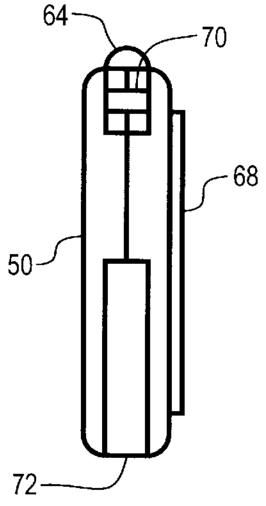
FIG. 3C is a side view of an electronic locator according to an illustrative embodiment of the present invention.

Reference is direct to FIG. 3A, FIG. 3B, and FIG. 3C, which are a front view, top view, and side view, respectively, of an electronic locator according to an illustrative embodiment of the present invention. The locator in the illustrative embodiment is enclosed in a housing 50, that may be a molded plastic case. A lanyard ring connection is formed with a pin 70 confined in a recess in a corner of the housing 50. This provides for a ready connection point to a key chain or other tethered connection with an object. An adhesive foam pad 68 is adhered to the back of the housing 50 and includes a peel-away cover that the user can remove to expose a second adhesive surface for attaching the locator to another object. A button cell battery is inserted into the locator case 50 by opening a battery cover 72 located at another corner of the case 50. Two indicators are provided in the illustrative embodiment. The first indicator is a visual indicator 64, which is a light emitting diode (LED) that is exposed through the top of the case 50. The second indicator is an acoustic indicator. An acoustic opening 66 is provided to allow sound produced by an internal piezoelectric sounding device, or beeper (not shown). The case is small in size, measuring approximately 1.3 inches by 0.9 inches by 0.2 inches in the illustrative embodiment.

Six key actuators, 52, 54, 56, 58, 60, and 62, are disposed in the front of the case 50. Each key actuator is identified with an Arabic numeral, one through six. In addition, a Braille symbol 74 is disposed on each key actuator, having a value equal to the associated Arabic numeral. Further, an area is reserved on the face of each key actuator 82 for attachment or disposition of an icon indicative of the item to which each actuator is associated. By way of example, the first actuator 52 has a key-shaped icon 76 attached that indicates that the actuator is associated with a set of keys. The second actuator 54 has a dollar sign icon 78, indicative of an association with a wallet or purse. The third actuator 56 has a "TV" icon 80 indicative of an association with a television remote control device. When the locator system is delivered to a user an adhesive sheet with plural icons of various symbols is provided so that the user can define each actuator in a way most useful and convenient for them.

Figure 4:
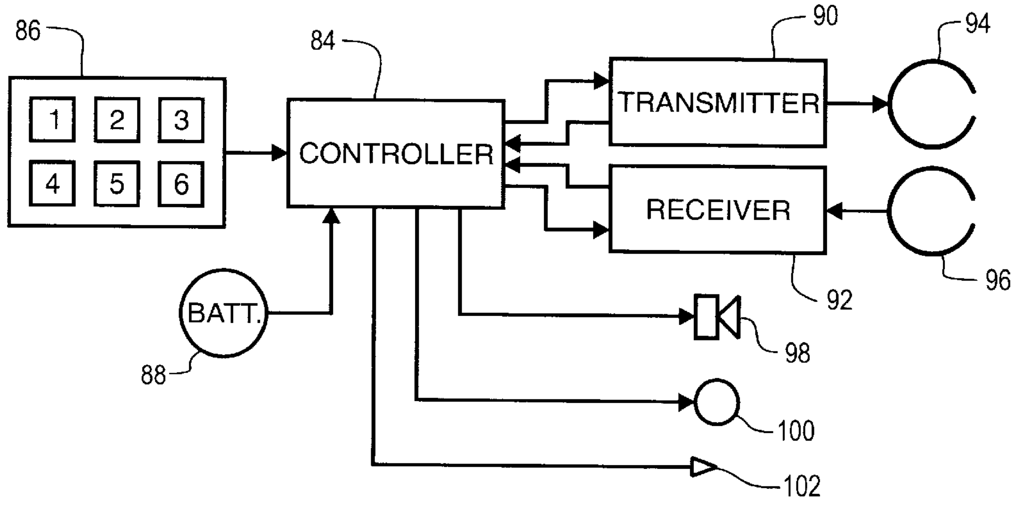
FIG. 4 is a functional block diagram of an electronic locator according to an illustrative embodiment of the present invention.

Reference is directed to FIG. 4, which is a functional block diagram of an electronic locator according to an illustrative embodiment of the present invention. The circuitry in the illustrative embodiment is comprised of highly integrated circuit devices that are supported on one or more printed circuit broads within the locator. A programmable controller 84 executes software source code stored in an internal memory. The software source code is programmed to perform the functional aspects of the hardware illustrated in FIG. 4. Those of ordinary skill in the art are familiar with the tools and processed employed in converting a functional specification into software source code for a particular control device and its related peripheral devices. The controller may be any of the various processors, microprocessors, controllers, microcontrollers, digital signal processors, or other programmable devices known to those skilled in the art to be suitable for dedicated control applications. A battery 88 is provided, which provides electric power to the controller 84 and other circuit components in the locator. A six-actuator key-matrix 86 is coupled to the controller 84. In the sleep mode of operation, the controller is responsive to a key actuation so as to wake-up and scan the keyboard to determine which key or keys has been actuated.

A radio transmitter 90 is coupled to receive search signals and found signals from the controller, and to modulate them onto, or as, a radio carrier (as in the case of on/off keyed transmission). In the illustrative embodiment, the radio frequency carrier signal is located in the 315 MHz band or the 433 MHz band and operates in accordance with the requirements of Federal Communications Commission (FCC) Part 15 (47 C.F.R. §15 et. seq.). An antenna 94 is coupled to transmitter 90. The antenna 94 is a loop antenna design that is disposed upon a printed circuit board. The loop antenna is utilized because of its relatively good performance in the presence of close proximity "hand capacitance." A receiver 92 is coupled to controller 84. The receiver 92 also operates in the 315 MHz band, aligned in frequency with the transmitter 90, and functions to receive and demodulate search signals and found signals transmitted from other functionally compliant locator devices. A separate receive antenna 96 is employed in the illustrative embodiment. The receive antenna 96 is also a loop antenna design that couples radio signals to the receiver 92.

The controller 84 operates to control the application of power to both of the transmitter 90 and the receiver 92. This is a useful power management feature as it allows the controller 84 to place the entire locator into a sleep mode where electric power consumption is minimized, thus maximizing battery life. The controller 84 is programmed to wake up upon actuation of one of the key actuators 86, or to wake up periodically to activate the receiver 92 to receive and check for incoming search signals. The timing relationships of the sleep mode and wake-up functions will be described more fully hereinafter. The controller 84 includes two indicator outputs in the illustrative embodiment. These outputs drive a piezoelectric sounding device 98, or beeper, and a light emitting diode 100. Since there are several different indications used in the illustrative embodiment, the controller 84 is programmed to activate the LED 100 and beeper 98 with various different cadences and time duration.

The illustrative embodiment of the present invention also addresses certain issues related to manufacturing, testing, and programming of locators. While the user interface provided is quite convenient for a typical user, it is cumbersome in a high volume production operation. To alleviate this issue, a programming port 102 is provided that couples directly to controller 84. This port 102 provides a duplex serial interface between the controller 84 and an externally accessible connector through a pair of conductors. In the production environment, and an automatic device is coupled to the programming port 102, and is operable to read programming information from the controller 84 and to write programming information into controller 84. Automatic programming devices are a species of the general class of equipment falling in the domain of automated test equipment, called "ATE" by those skilled in the art. Those skilled in the art are aware of various ATE devices that are programmable to read and write programming data to and from the controller 84. In the illustrative embodiment of the present invention, these include the unit identity, series identity and other data pertinent to the operation of the locator.

Figure 5:
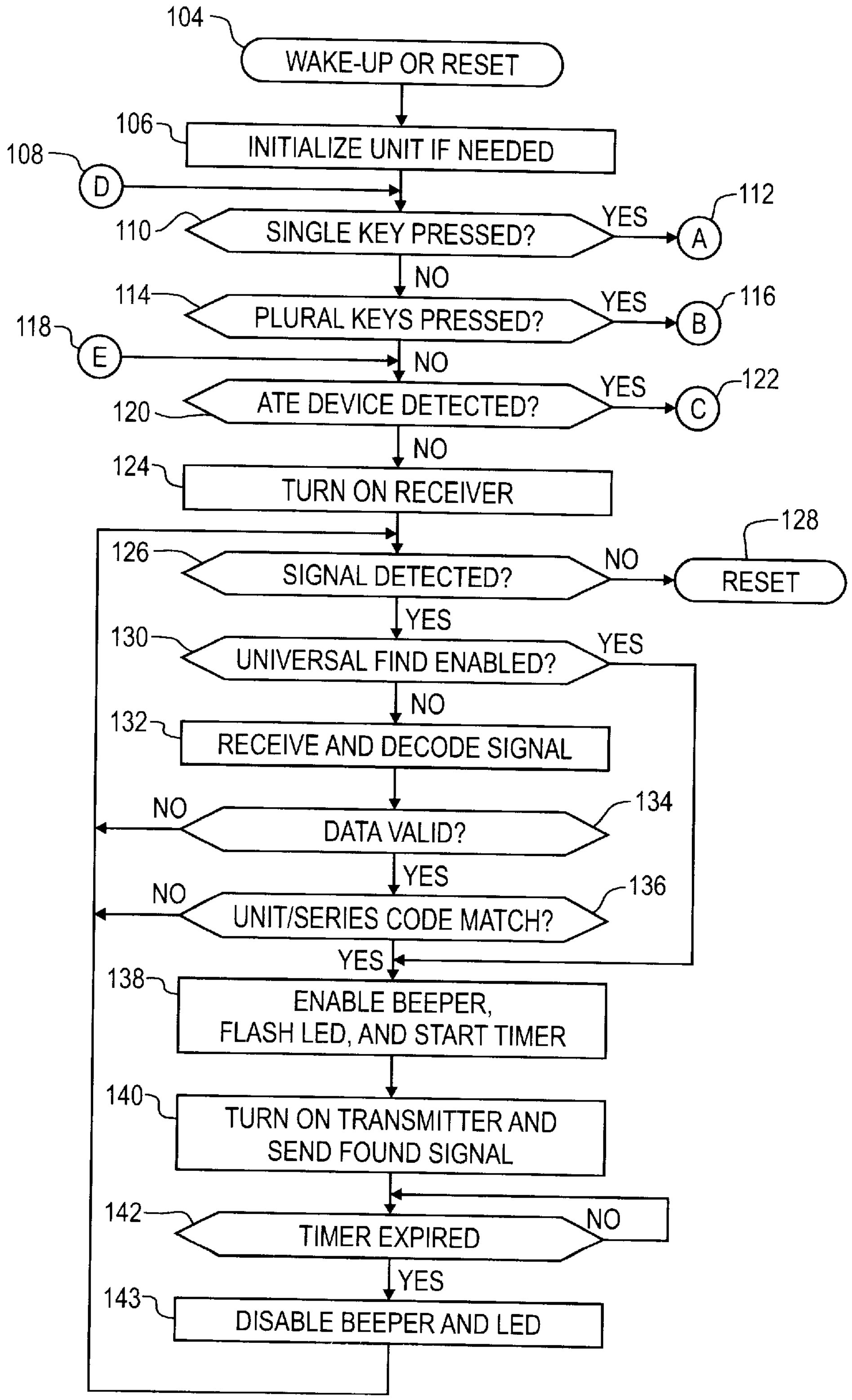
FIG. 5 is a flow diagram according to an illustrative embodiment of the present invention.

Reference is directed to FIG. 5, which is a software flow diagram according to an illustrative embodiment of the present invention. FIG. 5 is the main loop of the process flow, which begins at step 104 where the processor is reset or wakes-up from a previously set sleep mode. If the locator is reset, the software is initialized at step 106. Initialization is typically required on reset, but not wake-up. Those of ordinary skill in the art understand the activities addressed in a typical hardware reset of a dedicated control device, such as the present invention locator device. The next three sequences of steps deal with an action taken with respect to the locator user interface that initiates subsequent processes. In particular, step 110 tests to determine if the user has actuated a single key actuator, which indicates that a particular functionally compliant locator is being sought. If this action has occurred, flow proceeds through connecting node 112, which will be described hereinafter. Step 114 is a test to determine if plural key actuators are simultaneously being actuated. Actuation of plural actuators is used to alter programming data or read certain data from the controller memory. If this has occurred, then flow proceeds through connecting node 116, which will be described hereinafter. The next step is to test to determine if an ATE device has been physically connected to the programming port at step 120. If an ATE device has been connected flow proceeds through connecting node 122, which will be described hereinafter. If none of the aforementioned user interface actions has occurred, the process proceeds with an automatic receive sequence to check for any search messages that may be presently transmitted from another functionally compliant locator device.

Continuing in FIG. 5, at step 124, the process turns on the receiver to listen for a possible search signal being transmitted by a functionally compliant locator. In the illustrative embodiment, the controller is in a sleep mode and periodically wakes up to perform step 124. The timing relationship between how long and how often a searching controller transmits its search signal and how often and long the locator wakes up to receive such a message is structured to assure that a search and find operation can be accomplished within about two seconds. Those of ordinary skill in the art are familiar with such sleep mode and wake-up timing relationships. Step 126 is a test to determine if a search signal is detected during the wake-up interval. In the illustrative embodiment, the search signal includes a preamble portion, a header portion, and a data portion, as described herein before. The test at step 126 is looking for the preamble bit reversal signal. If no signal is detected, then the process is reset at step 128 and, in effect, returns to step 104 awaiting one of the aforementioned events of occur. On the other hand, at step 126, if a search signal is detected, then flow proceeds to step 130 to determine if a universal find mode of operation is presently enabled.

Universal find mode is a mode of operation in which the locator is responsive to all search signals. This mode is enabled as the default condition of not restoring unit identity and series identity after a battery change. Universal find mode is useful when programming is lost for any reason because it helps the user find a unit that has not yet been programmed after a battery change. While the universal find mode may not be convenient for locating a particular object, it is very useful when the user desires to locate all of the locators. In some applications, the universal find mode is the default mode of programming, used prior to the programming of particular unit identities and series identities. In FIG. 5, if the universal find mode is enabled at step 130, flow proceeds to step 138, where the indicators are activated, notwithstanding whatever unit identities and series identities are actually included in the search signal. This operation will be more fully described hereinafter. On the other hand, at step 130, if the universal find mode is not enabled, then flow proceeds to step 132.

At step 132, the receiver receives and the controller interprets the search signal, which includes the process of parsing the unit identity and series identity transmitted in the signal. At step 134, at test is made to determine if the data decoded is valid. Invalid data may exist due to transmission errors of due to transmissions not intended for the particular locator. If the data is not valid at step 134, then flow returns to step 126 to repeat the aforementioned signal detection test. On the other hand, if the data is valid at step 134, then flow proceeds to step 136 to test if the unit and series identity codes received match those programmed into the locator. If the codes do not match, then flow returns to step 126 where the signal detection test is again executed. On the other hand, at step 136, the unit and series identity codes do match, then flow proceeds to step 138 where the indicator alarms are activated.

Step 138 in FIG. 5 is the point in the process where the controller activates the indicators to alert the user of the location of the sought locator device. In the illustrative embodiment, the beeper emits repetitive beep tones and the LED sequentially flashes for a fixed duration of time. Thus, step 138 includes that function of starting the time that defines the alarm duration. Flow then proceeds to step 140 where the controller turns on the transmitter and sends a found signal. In the illustrative embodiment, the found signal is a series of bit reversals, containing no specific data. This approach has empirically demonstrated its effectiveness under varying signal conditions. While the found signal is not specific as to which unit is transmitting, or which search signal is being responded to, the temporal relationship between when the search signal is sent and when the found signal is received as proven to be very effective in making the identity determination needed in practical applications. Step 142 is a timer loop that tests for the duration of the indicator activation duration. Once expired, flow proceeds to step 143 where the indicator are de-activated. Flow then returns to step 126. Note that the loops from steps 134, 136 and 143 to step 126 are all exited when no signal is detected at step 126 and the process resets at step 128.

Figure 6:
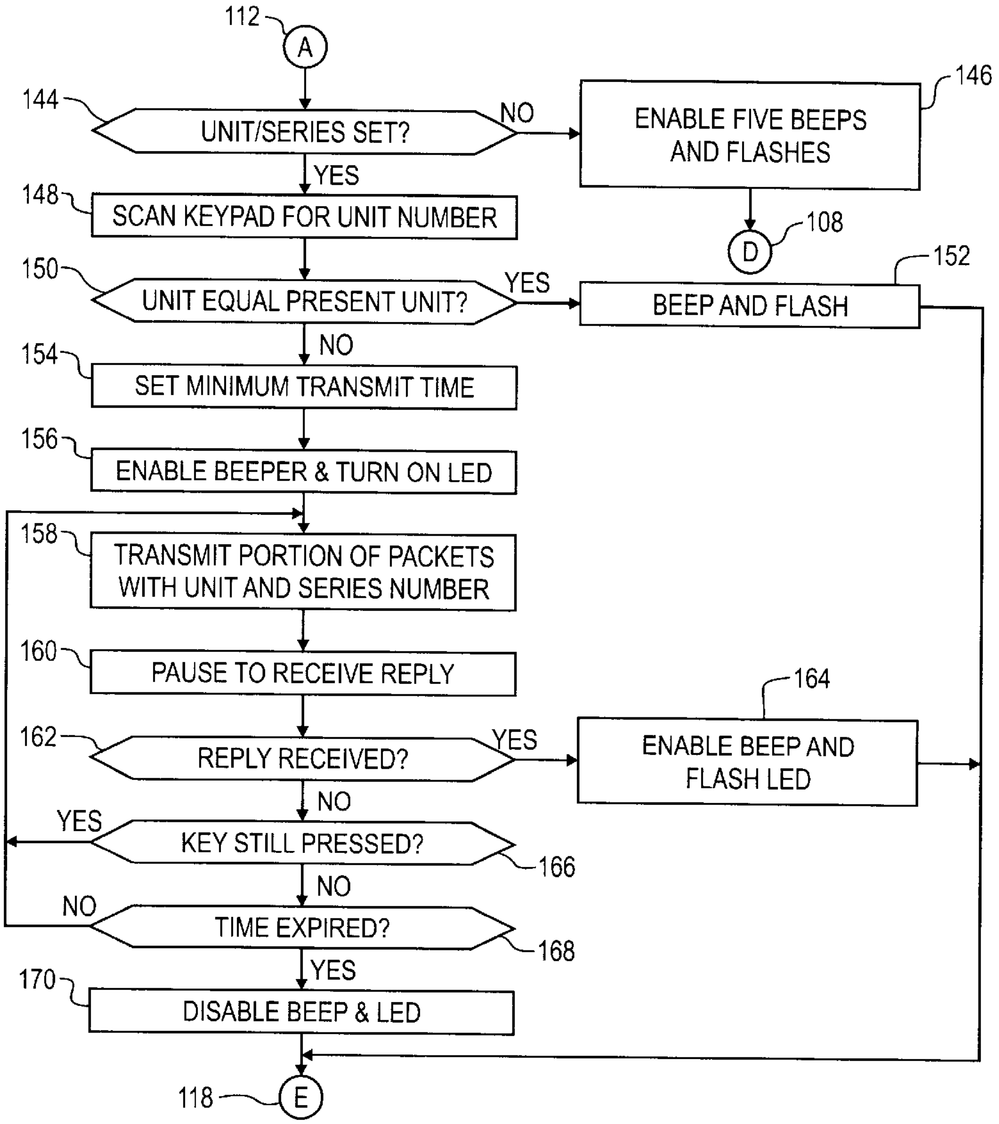
FIG. 6 is a flow diagram according to an illustrative embodiment of the present invention.

Reference is directed to FIG. 6, which is a flow diagram of the search signal transmission process according to an illustrative embodiment of the present invention. The flow diagram of FIG. 6 is entered through connection node 112, which couples from step 110 in FIG. 5. In FIG. 6, the process begins at step 144 by checking to determine if the unit identity and series identities are presently set in the sending locator. If not, the controller activates the beepers and LED to produce five beeps and flashes, respectively, to alert the user that there is no valid unit identity or series identity set. If the unit and series identities are set at step 144, then flow continues to step 148 where the controller scans the keypad to determine which key actuator has been actuated. The key pressed is correlated to a unit identity stored in the controller. Next, at step 150, a test is conducted to determine whether the actuated actuator key specifies the present locator. Obviously, this is an illogical choice. If this is the case, flow proceeds to step 152 where the controller beeps and flashes the indicators to alert the user of the illogical choice. From step 152, flow returns to step 120 in FIG. 5 via connection node 118. On the other hand, at step 150, if the user has selected another locator identity, then flow proceeds to step 154 where the search messaging process continues.

At step 154 in FIG. 6, a minimum transmit time is set in accordance with a preprogrammed parameter. A search signal typically includes several packets containing a preamble, header, and the unit and series identity values. The packet is sent repetitively during the minimum transmit time interval. Thus, the total search time can be set long enough so that the sleep and wake-up interval of the sought locator is certain to wake up and receive during the transmit time interval. Next, at step 156, the controller enables the beeper and the LED in the sending locator to indicate to the user that the key actuation has resulted in the desired search process.

Then, at step 158, one or more of the search packets are sent. At step 160, the transmitting locator pauses the transmission process to receive for a brief time period to determine if the sought locator has received the search signal and responded with the suitable found signal transmission. One of the advantages of the illustrative embodiment signaling process should be noted at this point. The found message is a simple series of bit reversals of carrier transmit pulses. Thus, the searching locator need only pause for a very few bit periods between search signal transmissions to detect the reply signal, since and entire data packet need not be received and decoded. After the receive pause of step 160, the controller tests to determine if the corresponding found signal has been received in reply at step 162. If the reply has been received, then the controller enables a beep and flash at step 164 to alert the user that a found signal has been received in reply. Flow then returns to step 120 in FIG. 5 via connection node 118.

Returning to FIG. 6, at step 162, if the reply signal has not been received, then flow continues to step 166 where the controller tests to determine if the user is still pressing the key actuator. It should be noted that the aforementioned minimum transmit time serves the purpose of establishing a minimum time duration only. The user can extent the time duration of the search by holding the key actuator in the actuated position. For example, the user could move about an area and hold the key until the desired response is received. If the key is still pressed at step 166, then flow returns to step 158 where another portion of the search signal is transmitted. If the key is not still pressed at step 166, then the controller proceeds to step 168 where a test is conducted to determine in the minimum transmit time has expired. If not, then flow returns to step 158. If the minimum transmit time has expired at step 168, then the search signal transmission procedure is complete and the controller disables the beeper and LED at step 170. Flow then returns to the main loop at step 120 in FIG. 5 via connecting node 118.

Figure 7:
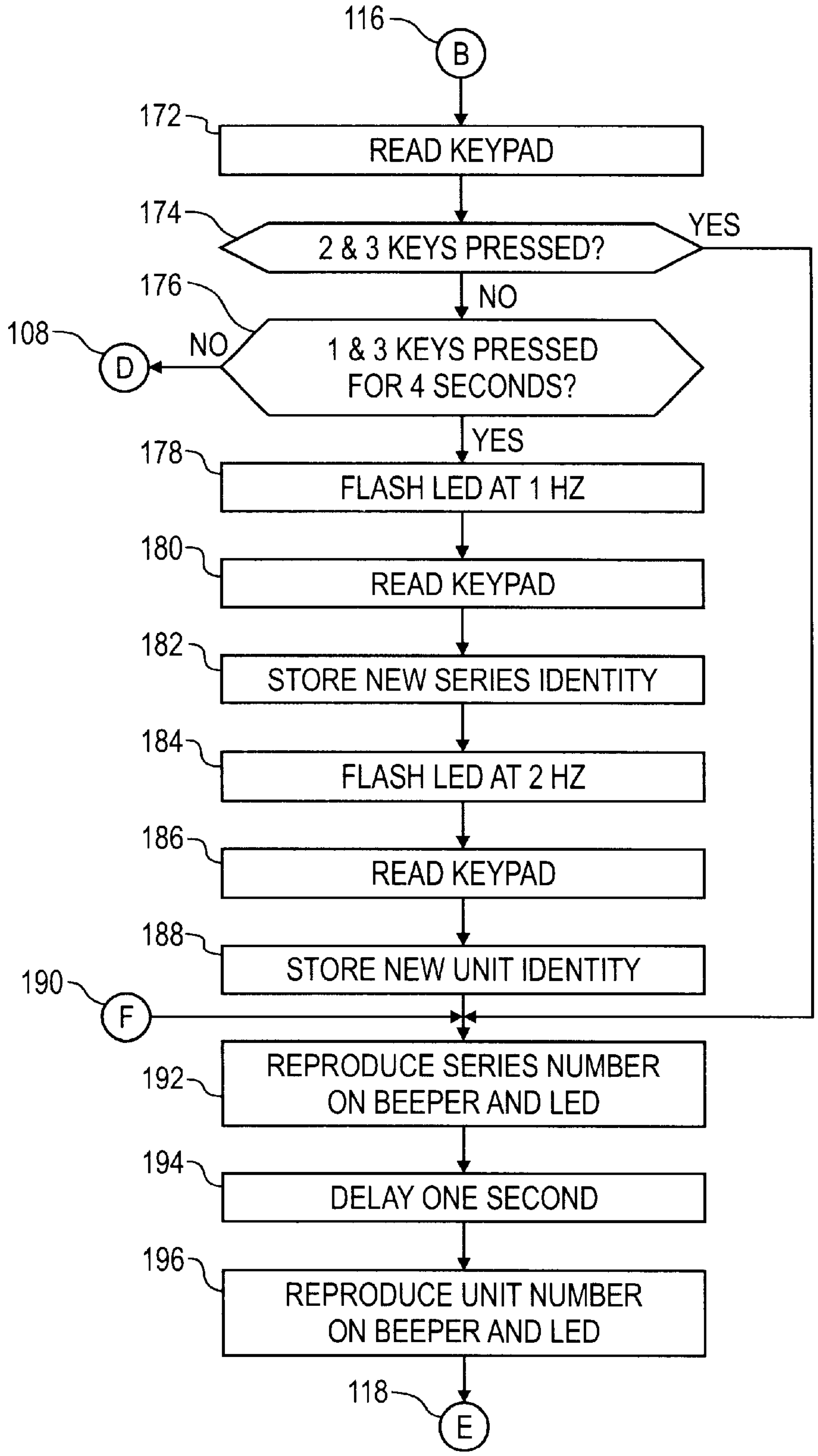
FIG. 7 is a flow diagram according to an illustrative embodiment of the present invention.

Reference is directed to FIG. 7, which is a flow diagram of certain programming and testing processes according to an illustrative embodiment of the present invention. The flow diagram of FIG. 7 is entered via connection node 116 that connects from step 114 in FIG. 5. In FIG. 7, the process begins at step 172 where the controller reads the keypad actuators to determine which actuators have been actuated. At step 174, as test is conducted to determine whether the number "2" and number "3" keys have been simultaneously actuated. If that is the case, then the user has queried the locator to display the current unit identity and series identity. This accomplished by proceeding to step 192 where the information is displayed in a display operation. Steps 192, and on, will be more fully described hereinafter. On the other hand, at step 174, if the other keys have been pressed, then flow proceeds to step 176. At step 176, a test is conducted to determine if the number "1" and number "3" keys have been simultaneously pressed for at least four seconds. If not, flow returns to step 110 in FIG. 5 via connection node 108. If the "1" and "3" keys have been pressed at step 176, then the user has initiated a programming mode that allows the user to change the unit identity and series identity of the locator.

The process of changing the unit and series identities of the locator begin at step 178 where the LED is flashed at a rate of once per second. This alerts the user that a new series number may be entered. At step 180, the controller reads the keypad to get the new series identity, and then stores that identity at step 182. Then, at step 184, the controller flashes the LED twice per second to alert the user that a new unit identity can be entered. This occurs at step 186 where the controller reads the user actuation and then stores that value at step 188. As a means of confirmation by display, the process reproduces the new or existing series number, by activating a corresponding number of beeps and flashes, at step 192. The process then delays for one second at step 194, and then reproduces the unit identity with a corresponding number of beeps and flashes at step 196. Having completed the programming or display operation, the process returns to step 120 in FIG. 5 via connecting node 118.

Figure 8:
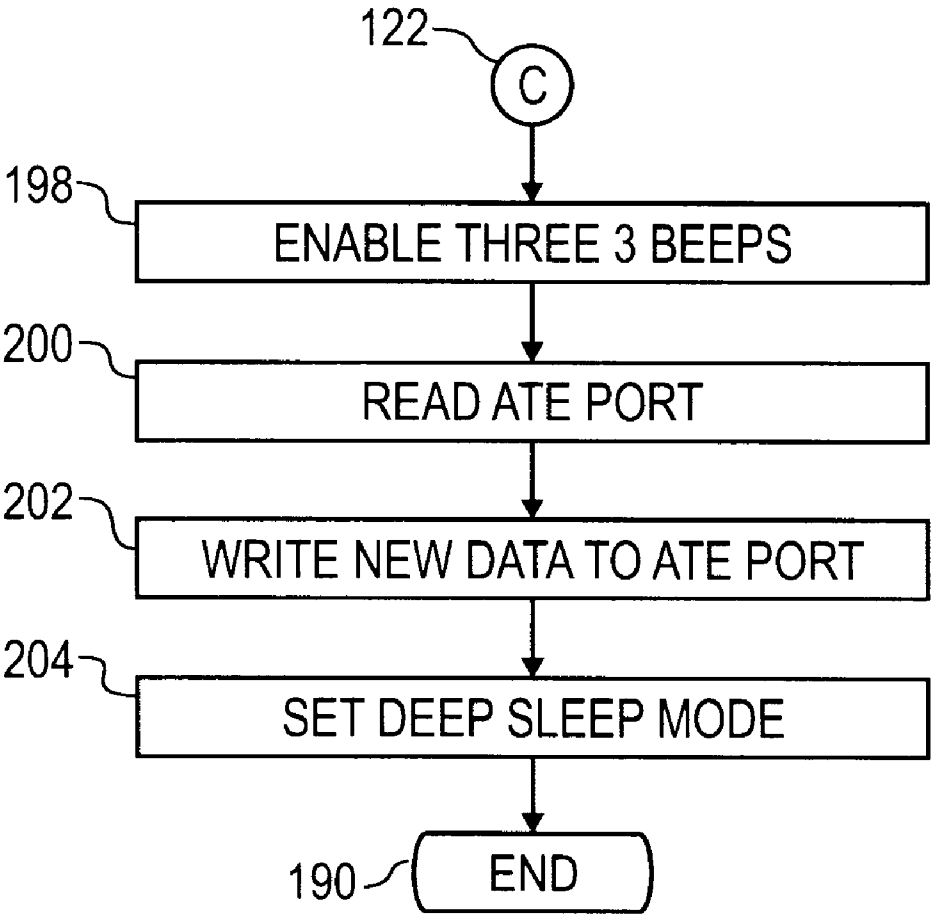
FIG. 8 is a flow diagram according to an illustrative embodiment of the present invention.

Reference is directed to FIG. 8, which is a flow diagram of the ATE device interconnection process according to an illustrative embodiment of the present invention. The process of FIG. 8 is entered from the detection of an ATE device at step 120 in FIG. 5, via connection node 122. The process of FIG. 8 begins be enabling three beeps of the beeper to indicate a successful interconnection. At step 200, the ATE port is read by the connected device to gather programming information, including the unit identity, series identity, and minimum transmit time of the locator. At step 202, the connected ATE device writes new data as parameters to the locator. The interconnection then sets a deep sleep mode at step 204. Since the ATE programming is typically accomplished at the time of manufacture, the deep sleep mode is activated to provide the longest possible battery shelf life by bypassing the periodic receiver actuation. The process ends at step 190.

Thus, the present invention has been described herein with reference to particular embodiments for particular applications. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A locator system, comprising:

plural locators that are functionally identical to each other except for a unique locator identity, each of said plural locators further comprising;

a controller;

an actuator coupled to said controller, for selecting the locator identity of any other of said plural locators;

an indicator coupled to said controller;

a transmitter coupled to transmit search signals and found signals output from said controller;

a receiver coupled to output received search signals and found signals to said controller, and wherein said controller outputs a first search signal that includes the locator identity of one of said plural locators selected by actuation of said actuator, and activates said indicator upon receipt of a first found signal responsive to said first search signal, and wherein said controller outputs a second found signal and activates said indicator in response to receipt of a second search signal that includes the locator identity of the receiving one of said plural locators.

2. The system of claim 1 wherein said locator identities include a unit identity.

3. The system of claim 1 wherein said locator identities include a series identity shared by a subset of said plural locators.

4. The system of claim 1 wherein said controller specifies a portion of the plural locator identities of said plural locators in accordance with actuation of said actuator.

5. The system of claim 4 wherein said actuator further comprises plural individual actuators coupled to said controller.

6. The system of claim 1 wherein said actuator includes a Braille symbol that is representative of the functionally compliant locator identity.

7. The system of claim 1 wherein said actuator includes and icon representative of an object for association with the functionally compliant locator.

8. The system of claim 7 wherein said icon is user selectable.

9. The system of claim 1 wherein said indicator is a visual indicator, an audible indicator, or a tactile indicator.

10. The system of claim 1 wherein said controller activates said indicator to produce a first indication upon said actuation of said actuator, a second indication upon said receipt of said first found signal, and a third indication upon receipt of said second search signal.

11. The system of claim 10 wherein said controller activates said indicator to produce a fourth indication if said actuation selects a unit identification of the locator.

12. The system of claim 1 wherein said transmitter is a radio transmitter.

13. The system of claim 12 wherein said transmitter operates compliant with FCC Part 15.

14. The system of claim 12 wherein said transmitter employees carrier pulse modulation.

15. The system of claim 1, further comprising an antenna coupled to said transmitter.

16. The system of claim 12 wherein said antenna is a loop antenna.

17. The system of claim 1, further comprising an antenna coupled to said receiver.

18. The system of claim 17 wherein said antenna is a loop antenna.

19. The system of claim 1 wherein said controller operates to interpret a sequence of actuator actions as programming instructions to define a unit identity or a series identity.

20. The system of claim 1, further comprising a programming port interface coupled to said controller for interfacing the locator to an external programming device for programming operational parameters there into.

21. The system of claim 1 wherein said controller, said actuator said indicator, said transmitter, and said receiver are combined into an object that is to be located.

22. The system of claim 1, further comprising:

an enclosure, and wherein said enclosure is color coded to identify the locator as being functionally compliant with the functionally compliant second locator.

23. A locator system, for locating objects associated therewith, comprising:

plural locators that are functionally identical to each other except for a unique locator identity, each of said plural locators further comprising;

a controller;

plural actuators coupled to said controller each for selecting one of said plural locators;

a visual indicator coupled to said controller;

an audible indicator coupled to said controller;

an FCC Part 15 compliant pulsed carrier radio transmitter, with a first antenna, coupled to transmit search signals and found signals output from said controller;

a radio receiver, with a second antenna, coupled to output received search signals and found signals to said controller, and wherein said controller is responsive to actuation of one of said plural actuators to output a first search signal having a unit identity consistent with the one of said plural locators selected by said actuation, and wherein said controller activates said visual indicator and said audible indicator upon receipt of a first found signal responsive to said first search signal, and wherein said controller outputs a second found signal and activates said visual indicator and said audible indicator in response to receipt of a second search signal that has a unit identity equal to a predetermined unit identity of the locator, and wherein said controller activates said visual indicator if an actuator actuation selects said predetermined unit identity, and wherein said controller operates to interpret a sequence of actuator actuations as programming instructions to program a unit identity.

24. A method of using a first locator, having a first actuator operable to select any other functionally identical locator, and a first indicator, and a functionally identical second locator, having a second actuator operable to select any other functionally identical locator, and a second indicator, both locators having a transceiver for transmitting and receiving wireless signals, to locate either locator with the other locator, comprising the steps of:

transmitting a first search signal, including the second locator identity, by the first locator, in response to actuation of the first actuator;

activating the second indicator and transmitting a first found signal by the second locator in response to receiving said first search signal;

receiving said first found signal by the first locator, and activating the first indicator by the first locator in response to receiving said first found signal.

25. The method of claim 24, further comprising the step of:

verifying said locator identity, by the second locator, as a prerequisite to performing said activating and transmitting step.

26. The method of claim 24 wherein said locator identity includes either a unit identity that identifies the second locator, or a series identity that identifies plural locators, including the second locator.

27. The method of claim 24, further comprising the step of:

specifying said second locator identity in accordance with said actuation of the first actuator.

28. The method of claim 24, further comprising the step of:

specifying one of plural locator identities in accordance with said actuation of the first actuator.

29. The method of claim 24, further comprising the step of:

identifying the first actuator using Braille character recognition.

30. The method of claim 24 wherein the first indicator is a visual indicator, an audible indicator, or a tactile indicator.

31. The method of claim 24, further comprising the step of:

activating the first indicator to produce a first indication upon said actuation of the first actuator.

32. The method of claim 24, further comprising the step of:

activating the first indicator to produce an indication that said actuation has selected the unit identification of the first locator.

33. The method of claim 24 wherein the transceiver is a radio transceiver.

34. The method of claim 33 wherein the transceivers employ carrier pulse modulation.

35. The method of claim 24, further comprising the step of:

repeating said transmitting a first search signal by the first locator step plural times, and interspersed with plural attempts at said receiving said first found signal by a first locator step.

* * * * *